J. B. WHITEHEAD.
HIGH VOLTAGE MEASURING INSTRUMENT.
APPLICATION FILED APR. 5, 1912.
1,059,095.   Patented Apr. 15, 1913.
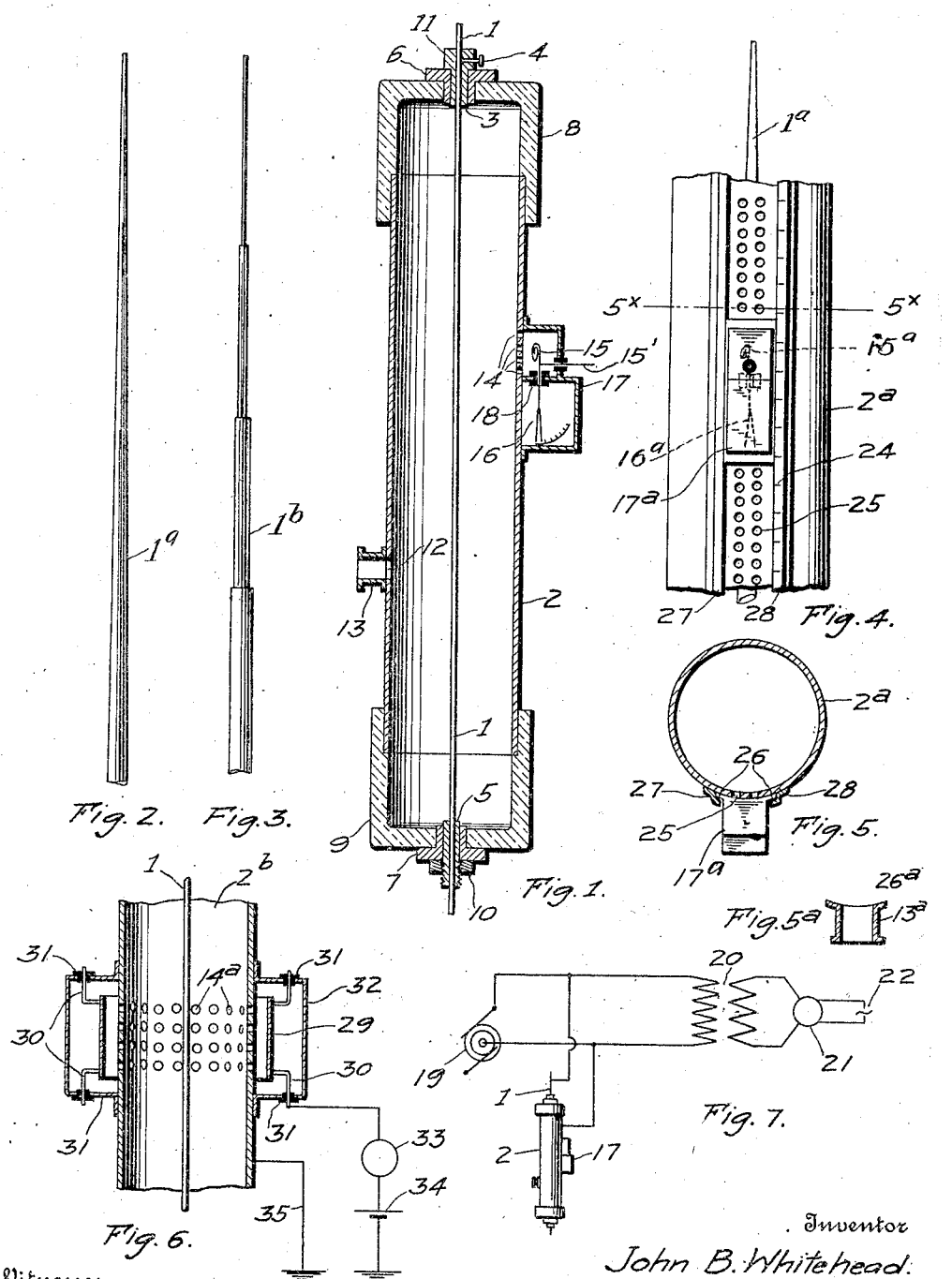

UNITED STATES PATENT OFFICE.

JOHN B. WHITEHEAD, OF BALTIMORE, MARYLAND.

HIGH-VOLTAGE-MEASURING INSTRUMENT.

1,059,095.  Specification of Letters Patent.  Patented Apr. 15, 1913.

Application filed April 5, 1912. Serial No. 688,758.

*To all whom it may concern:*

Be it known that I, JOHN B. WHITEHEAD, a citizen of the United States, residing at Baltimore city, State of Maryland, have invented certain new and useful Improvements in High-Voltage-Measuring Instruments, of which the following is a specification.

This invention relates to an apparatus for the measurement of high voltages, and is based on the fact that a visible discharge, or corona forms on a high voltage wire in air at a perfectly definite electric stress, and this stress depends in a definite way on the diameter of the wire. Corrections for temperature and pressure are easily applied.

The presence of corona indicates that the air ceases to insulate and that a leakage or power loss is present. This invention also makes use of the fact, to indicate the presence of the corona, that visible corona is accompanied by ionization and consequent conductivity of the surrounding air.

Aside from purely laboratory use, the invention has application in a practical way in the measurement of high voltage in many cases in which the methods at present in use do not permit of accurate determination. As an example of such practical application, I might mention the testing of insulation in high voltage apparatus. This, however, as well as many other points, will be gone into in greater detail in the description to follow.

In order to more fully describe my said invention, reference will be had to the accompanying drawings, wherein—

Figure 1 represents in central vertical section, one form of instrument embodying my said invention; Fig. 2 represents in side elevation, one of the forms in which the interior conductor may be made; Fig. 3, another form in which the interior conductor may be made; Fig. 4, a fragmentary front elevation of a form of the instrument employed with interior conductor of graduated diameter; Fig. 5, a section taken on line $5^x$—$5^x$, Fig. 5; Fig. 5ª, a detail central sectional view of an eye piece; Fig. 6, a fragmentary sectional semi-diagrammatic view of another form of instrument embodying my said invention; and Fig. 7, a diagram illustrating one of the practical applications of my invention.

In the form of the instrument as shown in Fig. 1, 1 represents a conductor, circular in cross section and of a diameter which has been found to correspond to a given critical surface intensity; that is, to the voltage gradient at the surface of the conductor at which visible corona appears and ionization of the neighboring air with accompanying conductivity begins. With a given size of outer cylinder the relation between the voltage applied between the cylinder and the wire, and the resulting surface intensity or gradient, in volts per centimeter, is given by the expression $$E = \frac{V}{r \log \cdot \frac{R}{r}}$$

where E is the surface intensity as stated above, V is the voltage in volts and $r$ and R are the radii of central wire and of the inner wall of the outer cylinder respectively. It is thus seen that there is a definite relation between the applied voltage and the surface intensity or gradient; and further that for air there is a definite surface intensity or gradient for each size of conductor at which the air breaks down, forming corona. This conductor lies in the longitudinal axis of a metal cylinder or tube 2, in which the conductor 1 is supported, in the case shown as follows:—The conductor extends at one end through an elongated metal collar or bushing 3, which is slidable on the said conductor, but is made fast thereto by a set screw 4. At its other end, the said conductor 1 passes through an elongated metal sleeve or bushing 5 which it fits tightly and to which it is made fast by soldering or otherwise. The bushings 3 and 5 lie respectively within fixed metal bushings 6 and 7 which extend through two central alined openings in two insulating caps 8 and 9 on the ends of the tube 2. The conductor 1 is drawn taut by means of a nut 10, screw threaded on the bushing 5 as shown, the upper end of the conductor being held rigidly by the bushing 3 which is provided with a head 11 which, being on the top of the bushing 6 resists the downward pull of the conductor.

The presence of the corona in this instrument may be detected in two ways; first directly visually, and second by means of an instrument responsive to the presence of the corona. For detecting the presence of the corona surrounding the conductor 1, in a direct way visually, the tube 2 is provided with a peep hole 12 and an eye piece 13. This hole and eye piece, however, may be located at any other desired point so long as they permit of sight of the conductor 1 within the tube 2.

For detecting the presence of the corona by means of an indicating device responsive thereto, in the case of the form of the instrument shown in Fig. 1, I provide at any desired position on the cylinder 2 a series of openings 14 through the wall of said cylinder, and locate just outside of these openings a conductor 15 which may be a small coil of wire which connects to a gold leaf electroscope 16, the said wire and electroscope being incased in a suitable box or housing 17, and the conductor 15 supported in an insulating bushing 18.

Each instrument may be supplied with any desired number of wires 1 of differing diameters, corresponding respectively to voltages at which corona forms around said wires, each such wires being preferably provided with a bushing such as 5, which may remain permanently on the wire, and with a bushing 3 which may, if desired, be made in a form to be slipped on and off the wire. A wire 1 is then selected corresponding to the voltage to be determined. Let us assume that this voltage represents the voltage that the insulation of a dynamo armature is required to stand and that we desire to test the insulation of this armature. Such a case is illustrated in the diagram Fig. 7, where 19 represents the armature being tested, 20 a transformer, 21 a voltage regulator connected between the primary of said transformer and a source of electromotive force 22. In such a case, the voltage to be determined is applied between the conductor 1 and the tube 2 of my instrument. Fig. 7 merely indicates these connections diagrammatically, though the instrument may be provided with terminal binding posts for making these connections. The voltage is then run up until the corona forms around the conductor 1. It is known that this corona forms around the selected conductor at a certain voltage. Therefore by merely observing the presence of this corona, the voltage becomes known. As stated above, this presence may be observed visually as described, or by means of an indicating instrument. To observe the presence of corona visually, however, requires that the instrument be in a dark room; whereas observation by means of an electroscope or other indicating instrument may be carried on anywhere.

The operation of the electroscope is due to the presence of ionization accompanying the formation of the corona. In the operation of the instrument, the electroscope is initially charged by any one of several well known methods, the electrode 15' being provided for this purpose. Then, under the presence of ionization, accompanying the formation of corona the electroscope loses its charge and the leaves collapse suddenly at the instant corona appears.

It is old, generally speaking, to observe the presence of corona visually, but I believe that I am the first to indicate this presence through the medium of ionization by means of an indicating instrument responsive thereto, and I believe that I am also the first to show the degree of accuracy, namely to a fraction of one per cent., with which the visible corona indicates the critical voltage.

For determining another voltage with the form of instrument shown in Fig. 1, another wire would be placed in the instrument, and so on for the various voltages to be determined, each such instrument being preferably provided with a number of calibrated wires.

Instead, however, of providing each instrument with a plurality of wires 1, each corresponding to a predetermined voltage, I may provide a single conductor for a number of different voltages by making the conductor of graduated diameter. For example, it may be a conical conductor $1^a$, or a stepped conductor $1^b$. In the case of the conical conductor, various points may be marked on the cylinder 2, corresponding to the voltage at which corona forms on a wire of diameter the same as that opposite the marked point. By thus noting the point on this conductor where the corona appears, the voltage may be determined. The marks 24 indicate the various voltages for which the wire has been calibrated.

In the case of the stepped conductor, Fig. 3, each separate diameter corresponds to a given voltage at which corona forms on that portion of the conductor, and by merely noting the presence of corona on any of these sections, the voltage is known.

Of course, when the conical or stepped conductor is used, the means for detecting the corona must be adjustable longitudinally of the conductor. For this purpose, the tube $2^a$ may be provided with a row of openings 25 extending longitudinally of the tube, in which case the peep hole or the conductor 15 and electroscope may be slidable longitudinally of said tube in any desired way. In the case of the conductor 15, this may be effected by providing the housing $17^a$, inclosing the electroscope $16^a$ and conductor $15^a$, with side flanges 26 which engage and slide in guides 27 and 28, fixed to the cylinder $2^a$. See Figs. 4 and 5.

The holes 25 may be used also for observing the corona visually, in which case an eye piece $13^a$, provided with flanges $26^a$ adapted to fit the guides 27 and 28, may be substituted for the indicating instrument.

In Fig. 6, I have shown the substitution of a galvanometer for an electroscope, and have also shown a different form of electrode from that indicated by the numeral 15 in Fig. 1. In Fig. 6, the tube 2ᵇ corresponds to the tube 2, Fig. 1, except that the tube 2ᵇ is provided with a belt of openings 14ᵃ extending entirely around the cylinder. Surrounding this belt of openings, is a metal collar or belt 29 which takes the place of electrode 15. This electrode 29 is held by supports 30, made fast in insulating bushings 31 in a metal casing 32. Connected in series between the electrode 29 and earth, are a galvanometer 33 and a battery or other source of continuous potential 34. The cylinder 2ᵇ is grounded as at 35.

In this way, the galvanometer is made readily responsive, through the medium of ionization, to the presence of the corona. It should be understood, however, that the form of electrode 29, Fig. 6, works well also with an electroscope and may be so used, and that the form of electrode 15 may be used with the galvanometer.

The corrections for temperature and pressure, which have been worked out experimentally, would be supplied with each instrument, either in the form of multiplying factors of the observed critical voltages, or in the form of curves.

Without limiting my invention to the specific forms thereof herein shown and described, what I claim is:—

1. A high voltage measuring instrument, comprising two concentric conductors, one of which has a diameter corresponding to a given critical intensity, substantially as described.

2. A high voltage measuring instrument, comprising two concentric conductors, one of which has a diameter corresponding to a given critical surface intensity, and indicating means responsive to the presence of corona surrounding the last named conductor, substantially as described.

3. A high voltage measuring instrument, comprising two conductors one of which has a diameter corresponding to a given critical surface intensity, and indicating means responsive to ionization set up by the formation of corona about the last named conductor, substantially as described.

4. A high voltage measuring instrument, comprising two conductors, one of which has a diameter corresponding to a known critical surface intensity, and indicating means comprising an electroscope responsive to ionization set up by corona formed about the last named conductor, substantially as described.

5. A high voltage measuring instrument, comprising two concentric conductors, one of which is of graduated diameter corresponding to known critical surface intensities, substantially as described.

6. A high voltage measuring instrument, comprising a cylinder of electrical conducting material, insulating caps on its ends, removable bushings centered in said caps in alinement with each other, and an electrical conductor mounted in said bushings and concentric with said cylinder, the said conductor having a diameter corresponding to a given critical surface intensity, substantially as described.

7. A high voltage measuring instrument, comprising a cylinder of electrical conducting material having one or more openings through its side, an electrical conductor concentrically mounted within said cylinder and extending longitudinally thereof, insulating supports for said conductor, an electrode adjacent said openings outside of said cylinder, and indicating means connected to said electrode and responsive to the presence of corona formed about said conductor within said cylinder, substantially as described.

8. A high voltage measuring instrument, comprising a cylinder of electrical conducting material, an electrical conductor having a diameter corresponding to a known critical surface intensity and mounted within said cylinder, concentrically therewith, the said cylinder having one or more openings for the detection of the presence of corona about said conductor, substantially as described.

9. A high voltage measuring instrument, comprising a cylinder of electrical conducting material having a row of holes in its side extending longitudinally thereof, an electrical conductor of graduated diameter corresponding to known critical surface intensities and mounted within said cylinder concentrically therewith, and means responsive to the presence of corona about said conductor, adjustably mounted for movement longitudinally of said tube in front of said openings, substantially as described.

10. A high voltage measuring instrument, comprising a cylinder of electrical conducting material, insulating caps over its ends, bushings centered in said caps, a conductor extending through said bushings axially of said cylinder and made fast to said bushings, the said conductor having a diameter corresponding to a known critical surface intensity, and means coöperating with said bushings to draw said conductor taut, substantially as described.

In testimony whereof I affix my signature in presence of two witnesses.

JOHN B. WHITEHEAD.

Witnesses:
Wm. H. Yeatman,
Joseph A. Neumann.